(12) United States Patent
Lyon

(10) Patent No.: US 9,914,445 B2
(45) Date of Patent: Mar. 13, 2018

(54) CONTROL DEVICE FOR VEHICLE

(75) Inventor: Angus Rutherford Lyon, Fritwell (GB)

(73) Assignee: PROTEAN ELECTRIC LIMITED (GB)

( * ) Notice: Subject to any disclaimer, the term of this patent is extended or adjusted under 35 U.S.C. 154(b) by 814 days.

(21) Appl. No.: 13/520,555

(22) PCT Filed: Dec. 16, 2010

(86) PCT No.: PCT/IB2010/055889
§ 371 (c)(1),
(2), (4) Date: Jul. 3, 2012

(87) PCT Pub. No.: WO2011/083383
PCT Pub. Date: Jul. 14, 2011

(65) Prior Publication Data
US 2012/0283904 A1    Nov. 8, 2012

(30) Foreign Application Priority Data
Jan. 5, 2010 (GB) .................................. 1000080.0

(51) Int. Cl.
*B60L 9/00* (2006.01)
*B60L 11/00* (2006.01)
(Continued)

(52) U.S. Cl.
CPC .............. *B60W 10/20* (2013.01); *B60K 6/26* (2013.01); *B60K 6/46* (2013.01); *B60K 7/0007* (2013.01);
(Continued)

(58) Field of Classification Search
CPC ........ B62D 6/00; B62D 15/025; B62D 13/00; B62D 12/00; B62D 13/06; B62D 15/021;
(Continued)

(56) References Cited

U.S. PATENT DOCUMENTS 4,698,536 A * 10/1987 Oohori ...................... B60T 1/06
                                                              188/181 A
4,735,274 A *  4/1988 Good ................. B62D 15/0285
                                                              180/167

(Continued)

FOREIGN PATENT DOCUMENTS

EP    1138448 A2    10/2001
GB    2336890 A     11/1999
(Continued)

OTHER PUBLICATIONS

Written Opinion of the PCT International Searching Authority, dated Jul. 5, 2012, Published by the Europen Patent Office.
(Continued)

*Primary Examiner* — Jelani A Smith
*Assistant Examiner* — Luis A Martinez Borrero
(74) *Attorney, Agent, or Firm* — Valerie M. Davis; The Mason Group Patent Specialists LLC

(57) ABSTRACT

A control device for a vehicle comprising a moveable element and means for outputting a signal indicative of an angle that a wheel of a vehicle should be rotated through, thereby allowing movement of the vehicle, wherein the indicated angle is based on the degree of movement the moveable element is moved through.

10 Claims, 4 Drawing Sheets

(51) Int. Cl.

| | | |
|---|---|---|
| *B60W 10/20* | (2006.01) | |
| *B60K 6/26* | (2007.10) | |
| *B60K 6/46* | (2007.10) | |
| *B60K 7/00* | (2006.01) | |
| *B60L 15/20* | (2006.01) | |
| *B60W 10/08* | (2006.01) | |
| *G05B 19/427* | (2006.01) | |
| *B60K 1/02* | (2006.01) | |
| *B60W 20/00* | (2016.01) | |

(52) U.S. Cl.
CPC ........... *B60L 15/20* (2013.01); *B60L 15/2063* (2013.01); *B60W 10/08* (2013.01); *G05B 19/427* (2013.01); *B60K 1/02* (2013.01); *B60K 2007/0038* (2013.01); *B60K 2007/0092* (2013.01); *B60L 2220/44* (2013.01); *B60L 2240/423* (2013.01); *B60L 2260/28* (2013.01); *B60W 20/00* (2013.01); *B60W 2510/20* (2013.01); *B60W 2540/18* (2013.01); *B60W 2710/083* (2013.01); *B60W 2720/28* (2013.01); *Y02T 10/6217* (2013.01); *Y02T 10/645* (2013.01); *Y02T 10/646* (2013.01); *Y02T 10/648* (2013.01); *Y02T 10/72* (2013.01); *Y02T 10/7275* (2013.01)

(58) Field of Classification Search
CPC ..... B62D 5/0403; B62D 5/0457; G06F 17/50; G06F 17/00; G06F 7/00; G06F 17/3056; G06F 3/017; G06F 11/2023; G06F 17/30528; B60W 2420/42; B60W 2550/10; B60W 10/18; B60W 50/082
USPC ..... 180/412, 65.1, 65.5, 6.2; 701/22, 69, 41, 701/42, 23, 1, 49, 37, 112, 20; 116/31
See application file for complete search history.

(56) References Cited

U.S. PATENT DOCUMENTS

| | | | | |
|---|---|---|---|---|
| 6,018,692 | A * | 1/2000 | Shimizu | B62D 15/0285 180/204 |
| 6,139,468 | A * | 10/2000 | Goates | F16H 59/105 477/906 |
| 6,487,481 | B2 * | 11/2002 | Tanaka | B62D 15/0275 340/932.2 |
| 7,270,204 | B2 * | 9/2007 | Taniguchi | B60K 7/0007 180/65.51 |
| 8,360,186 | B2 * | 1/2013 | Yamamoto | B60K 7/0007 180/65.51 |
| 9,505,436 | B2 * | 11/2016 | Yamashita | B62D 15/028 |
| 9,517,766 | B2 * | 12/2016 | Nakada | B60W 10/04 |
| 2002/0149188 | A1 * | 10/2002 | Major | B60B 39/024 280/757 |
| 2003/0182810 | A1 * | 10/2003 | Sano | B62D 15/02 33/1 PT |
| 2003/0211832 | A1 * | 11/2003 | Inokoshi | A63H 30/04 455/73 |
| 2004/0163856 | A1 * | 8/2004 | Kroppe | B60K 17/16 180/6.2 |
| 2004/0230361 | A1 * | 11/2004 | Oshima | B62D 7/1509 701/69 |
| 2004/0257244 | A1 * | 12/2004 | Kubota | B62D 15/0285 340/932.2 |
| 2005/0021203 | A1 * | 1/2005 | Iwazaki | B62D 15/0285 701/36 |
| 2005/0228554 | A1 * | 10/2005 | Yamamoto | B60K 6/44 701/22 |
| 2006/0136109 | A1 * | 6/2006 | Tanaka | B60W 40/04 701/41 |
| 2006/0137926 | A1 * | 6/2006 | Taniguchi | B60K 7/0007 180/65.51 |
| 2006/0151220 | A1 * | 7/2006 | Taniguchi | B60K 6/26 180/65.51 |
| 2007/0209852 | A1 * | 9/2007 | Kamiya | B60G 3/20 180/65.51 |
| 2008/0154464 | A1 * | 6/2008 | Sasajima | B62D 15/0285 701/42 |
| 2008/0308330 | A1 * | 12/2008 | Murata | B60G 7/005 180/65.51 |
| 2009/0095562 | A1 * | 4/2009 | Yasui | B60W 30/045 180/412 |
| 2009/0281692 | A1 * | 11/2009 | Tamaizumi | B62D 5/0484 701/42 |
| 2010/0070139 | A1 * | 3/2010 | Ohshima | B60R 1/00 701/42 |
| 2010/0116572 | A1 * | 5/2010 | Schmitt | B60G 3/28 180/65.51 |
| 2010/0198441 | A1 * | 8/2010 | Mizuno | B62D 17/00 701/22 |
| 2010/0211265 | A1 * | 8/2010 | Iwata | B62D 15/027 701/41 |
| 2010/0235050 | A1 * | 9/2010 | Iwata | B60Q 1/085 701/41 |
| 2010/0324766 | A1 * | 12/2010 | Linda | B60T 8/172 701/22 |
| 2011/0022268 | A1 * | 1/2011 | Kojo | B62D 5/008 701/41 |
| 2011/0144848 | A1 * | 6/2011 | Yoshizue | B60K 7/0007 701/22 |
| 2011/0148180 | A1 * | 6/2011 | Szelag | B60B 7/20 301/1 |
| 2012/0072065 | A1 * | 3/2012 | Minamikawa | B60K 6/365 701/22 |
| 2015/0100177 | A1 * | 4/2015 | Inagaki | B60W 30/06 701/1 |
| 2016/0006387 | A1 * | 1/2016 | Nakamura | H02P 29/032 701/43 |
| 2016/0117926 | A1 * | 4/2016 | Akavaram | G08G 1/143 340/932.2 |
| 2017/0029013 | A1 * | 2/2017 | Oya | B62D 15/027 |

FOREIGN PATENT DOCUMENTS

| | | | |
|---|---|---|---|
| WO | 2004028848 A1 | 4/2004 | |
| WO | WO 2008027159 A2 * | 3/2008 | ............... B60K 7/00 |

OTHER PUBLICATIONS

Intellectual Property Office, Patents Act 1977:Search Report Under Section 17, Jan. 19, 2010, United Kingdom.
Intellectual Property Office, Patents Act 1977:Search Report Under Section 17, Jan. 30, 2012, United Kingdom.
PCT international Search Report, dated May 20, 2011, European Patent Office.

* cited by examiner

CONTROL DEVICE FOR VEHICLE

The present invention relates to a control device for a vehicle, in particular a control device for manoeuvring a vehicle.

To control the position of a motor vehicle, the motor vehicle will typically include an accelerator, which a driver of a vehicle uses, typically in conjunction with a gearbox and a clutch, to initiate movement of the vehicle, and a brake, which a driver of a vehicle uses to inhibit movement of the vehicle.

However, although the use of an accelerator and brake to control the movement of a vehicle works well when travelling over relatively long distances; over relatively short distances, for example a few meters, the coordination of the accelerator and brake to manoeuvre a vehicle to a precise location can be difficult and can require considerable experience before a high level of proficiency is achieved.

To address this problem vehicle control systems have been developed that are arranged to automatically move a vehicle a predetermined distance. Such control systems require a user to input a predetermined distance into the vehicle control system. Once the predetermined distance is input into the vehicle control system, the vehicle control system controls the operation of the vehicle to allow the vehicle to be moved the predetermined distance.

However, it may not always be possible to accurately pre-judge the distance a vehicle needs to travel. As such, using a vehicle control system that requires the input of a predetermined distance may either result in the vehicle over shooting the required distance or require multiple manoeuvres to allow the vehicle to be moved to the required position.

As such, there is a need for a system that allows accurate vehicle position control that does not require the coordination of multiple inputs, such as an accelerator and brake, and does not require accurate distance information prior to a manoeuvre.

In accordance with an aspect of the present invention there is provided a control device or a vehicle having a control device according to the accompanying claims.

By correlating the rotation of a dial on a control device with the rotation of at least one of the wheels of the vehicle a user is able to move a vehicle accurately using a single control element, where the user is able to inch the vehicle forwards or backwards precisely by rotating the control element clockwise or anticlockwise according to the required direction of the vehicle.

The present invention will now be described, by way of example, with reference to the accompanying drawings, in which.

Figure 5:
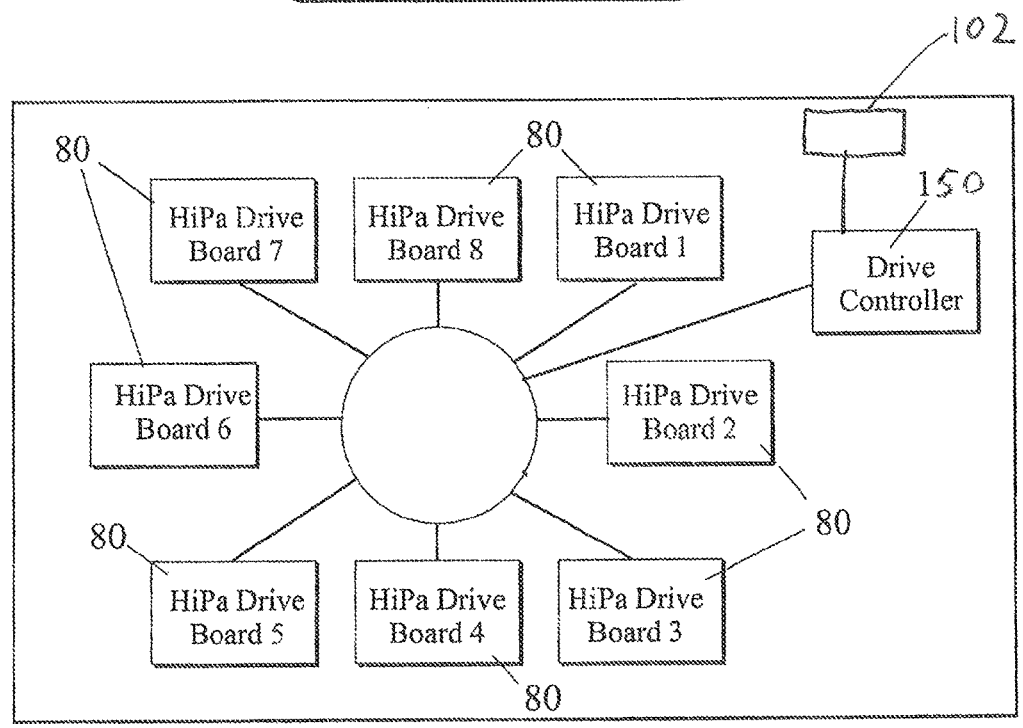
Figure 4:
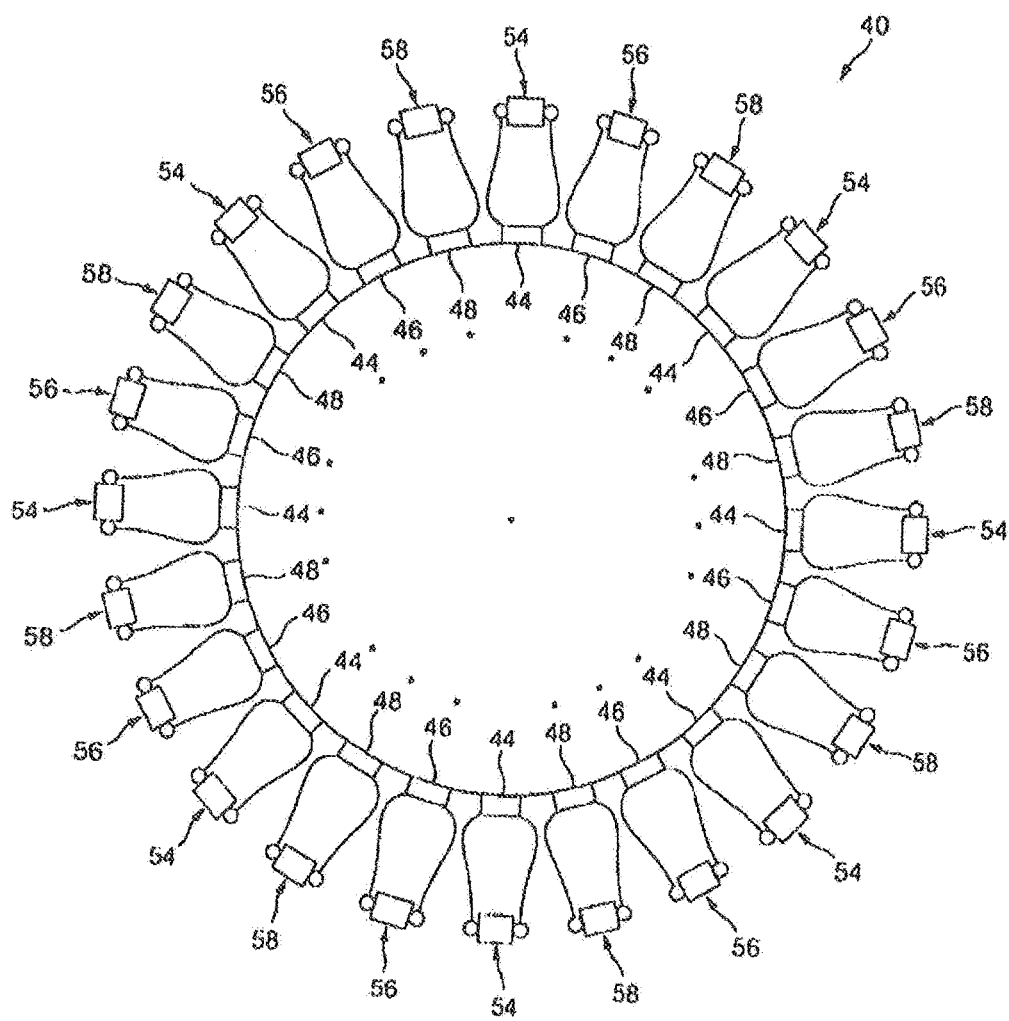

FIG. 4 schematically shows an example for a three phase motor used in an embodiment of the present invention;

FIG. 5 illustrates the communication interface between control modules in a vehicle according to an embodiment of the present invention.

Figure 1:
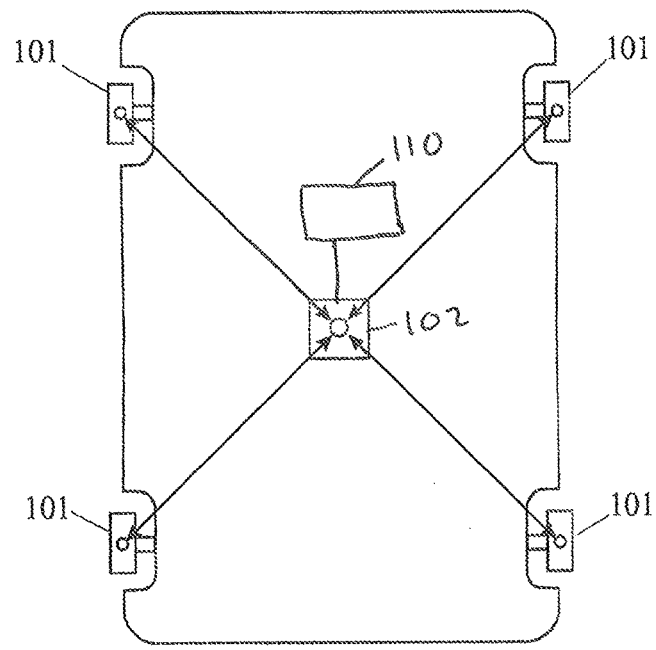
FIG. 1 illustrates a vehicle according to an embodiment of the present invention.

FIG. 1 illustrates a vehicle 100, for example a car or lorry, having four wheels 101, where two wheels are located in the vehicle's forward position in a near side and off side position respectively. Similarly, two additional wheels are located in the vehicle's aft position in near side and off side positions respectively, as is typical for a conventional car configuration. However, as would be appreciated by a person skilled in the art, the vehicle may have any number of wheels. The vehicle 100 illustrated in FIG. 1 is arranged to allow accurate manoeuvring by providing accurate rotational position control of the wheels, as described in detail below.

Incorporated within each wheel 101 is a drive unit that takes the form of an in-wheel electric motor. Although the current embodiment describes a vehicle having an in-wheel electric motor associated with each wheel 101, as would be appreciated by a person skilled in the art a central electric motor may be used in place of the in-wheel electric motors or only a subset of the wheels 101 may have an associated in-wheel electric motor. For example, for a four wheeled vehicle only the front two wheels may have associated in-wheel motors or alternately only the rear two wheels may have associated in-wheel motors. Alternatively, other forms of drive unit may be used, for example a centrally mounted internal combustion engine.

Coupled to each in-wheel electric motor is a master controller 102 for controlling the operation of the in-wheel electric motors, as described in detail below. Coupled to the master controller 102 is a control device 110 that is arranged to allow a user of the vehicle to control the angle of rotation that at least one of the wheels is rotated through.

The control device 110 includes a position sensor 130 and a rotating element 120, also referred to herein as a rotational element 120, which is for example a circular dial also referred to herein as a control dial or simply as a dial. The position sensor 130 is arranged to output to the master controller 102 a signal indicative of the rotational position of the rotating element 120. For example, the position sensor 130 can be configured to output a signal indicative of zero degrees when a marker on the rotating element 120 is positioned in its upper most position and output a signal indicative of 180 degrees when the rotating element 120 has been rotated 180 degrees from the 'zero' position. However, any rotational position of the rotational element 120 may be defined as the rotational element's zero position (i.e. the rotational position of the rotational element 120 that results in the position sensor 130 outputting a zero degree signal). Alternatively, the position sensor 130 may be configured to output an analogue or digital voltage signal from which the motor controller 102 determines a 'zero' position.

To avoid the control device providing angular rotational control of the wheels when not required, there is preferably provided means for allowing a user to activate/deactivate an angular rotational wheel control drive mode that enables/disables operation of the control device. For example, the angular rotational wheel control mode could be activated/deactivated via a gear selection position or an activation switch located within the vehicle or on the control device.

Although for the purposes of the present embodiment the control device 110 is situated within the vehicle, for example on the vehicle dashboard, the control device 110 could equally be located remote to the vehicle with the control device 110 being coupled to the master controller 102 via a wired or wireless link.

For the purpose of illustration the in-wheel electric motor is of the type having a set of coils being part of the stator for attachment to the vehicle, radially surrounded by a rotor carrying a set of magnets, to which a wheel is attached. However, as would be appreciated by a person skilled in the art, the present invention is applicable to other types of electric motors.

Figure 2:
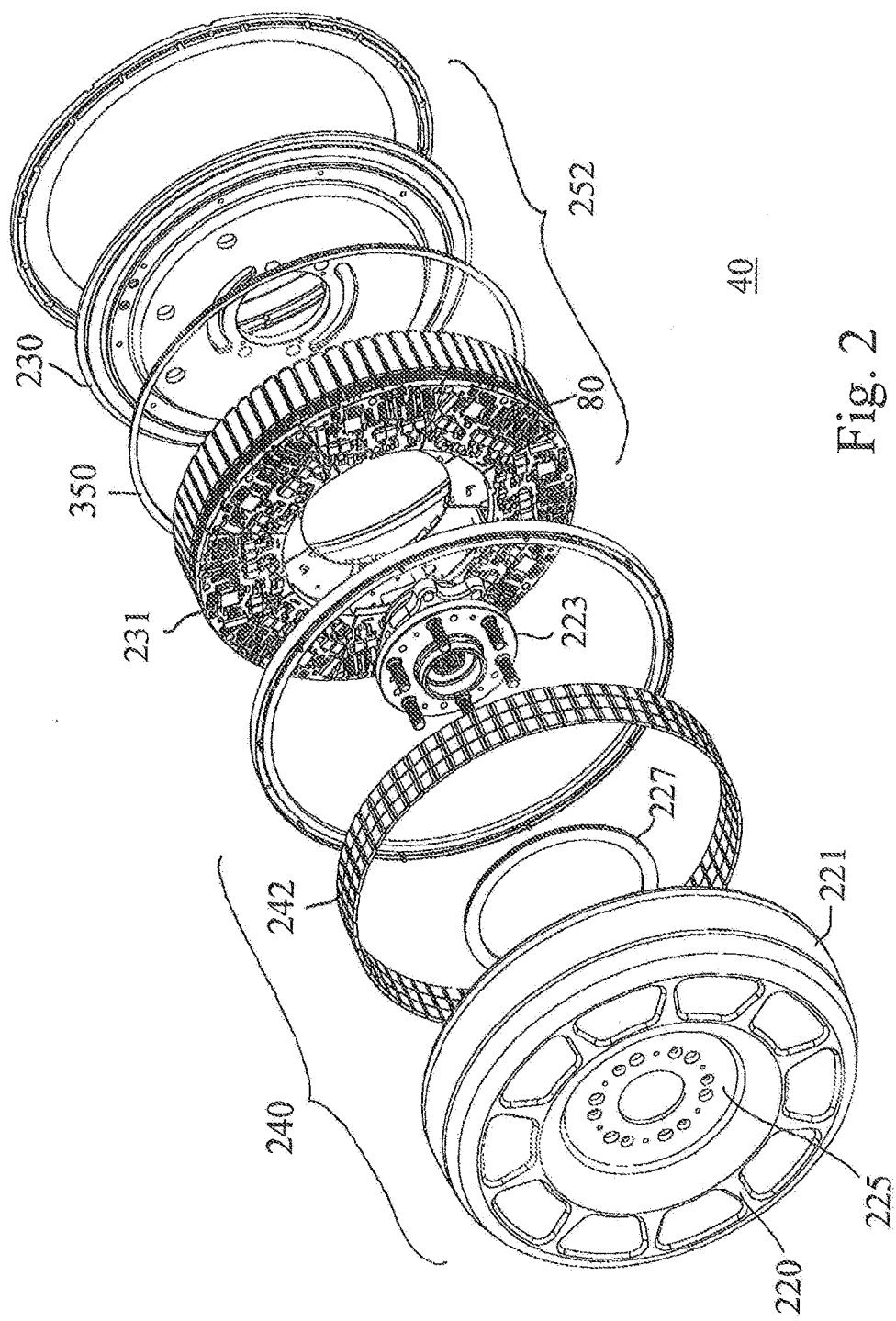
FIG. 2 illustrates an exploded view of an electric motor as used in an embodiment of the present invention.

As illustrated in FIG. 2, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate during use. The coils themselves are formed on tooth laminations which together with the drive arrangement 231 and rear portion 230 form the stator 252.

A rotor 240 comprises a front portion 220 and a cylindrical portion 221 forming a cover, which substantially surrounds the stator 252. The rotor includes a plurality of magnets 242 arranged around the inside of the cylindrical portion 221. The magnets are thus in close proximity to the coils on the assembly 231 so that magnetic fields generated by the coils in the assembly 231 react against the magnetic fields generated by the magnets 242 arranged around the inside of the cylindrical portion 221 of the rotor 240, causing a torque to be generated.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 3:
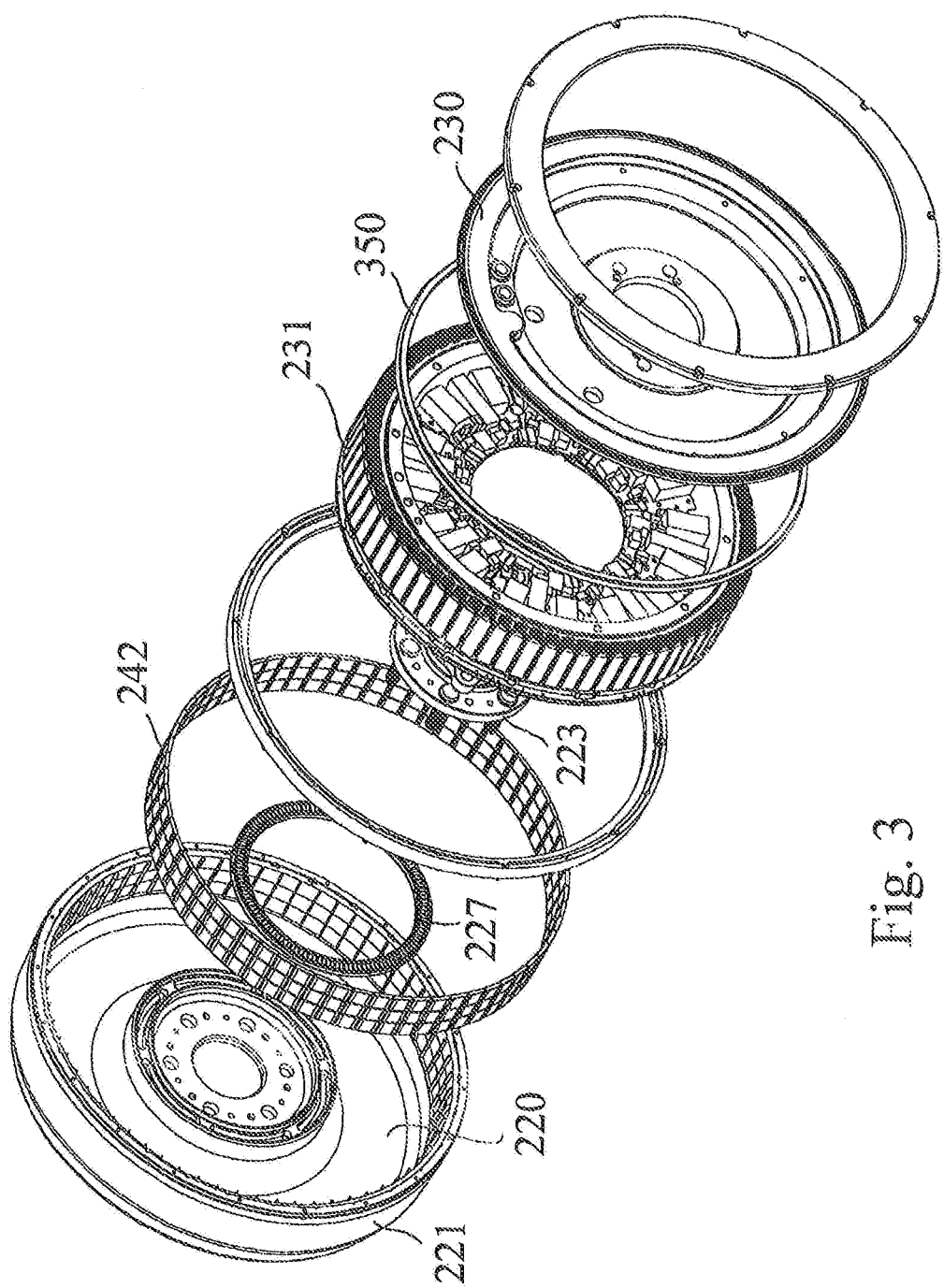
FIG. 3 illustrates an exploded view of the electric motor shown in FIG. 2 from an alternative angle.

FIG. 3 shows an exploded view of the same assembly as FIG. 2 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 2 are circuit boards 80 carrying control electronics, otherwise known as motor drive controllers.

A V shaped seal 350 is provided between the circumferential wall 221 of the rotor and the outer edge of the stator housing 230.

The rotor also includes a focussing ring and magnets 227 for position sensing, which in conjunction with sensors mounted on the stator allows for an accurate position determination of the rotor relative to the stator to be made. However, other means for determining the position of the rotor may be used.

The electric motor 40 shown in FIGS. 2 and 3 is a three phase motor having three coil sets. In this embodiment, each coil set includes eight coil sub-sets. However, as would be appreciated by a person skilled in the art, the electric motor could have any number of coil sets and coil sub-sets. The coil sub-sets of each coil set are labelled 44, 46 and 48, respectively in FIG. 4. Accordingly, the electric motor illustrated in FIG. 4 has a total of twenty four coil sub-sets (i.e. eight coil sub-sets per coil set).

By way of example, in FIG. 4 some of the coil sub-sets are highlighted with a '*'. If these coil sub-sets were to be powered down, the motor would still be able to operate, albeit with reduced performance. In this way, for a given current flow within the coil sub-sets the power output of the motor can be adjusted in accordance with the requirements of a given application. In one example, where the motor is used in a vehicle such as a car, powering down of some of the coil sub-sets can be used to adjust the performance of the car. In the example shown in FIG. 4, if each of the coil sub-sets indicated with an '*' were powered down the motor would have three coil sets with each coil set having two active coil subsets.

A motor drive controller 80 is arranged to drive a group of three coil subsets under control from a motor control unit (not shown). For example, a motor drive controller can be associated with the first three coil subsets 44, 46, 48 located at the top of FIG. 4. Another motor drive controller 80 is associated with the next three coil subsets, and so on. Accordingly, the in-wheel electric motor includes eight motor drive controllers 80 arranged to drive the respective coil subsets to form a distributed internal motor architecture that uses multiple motor drive controllers 80 for controlling the torque generated by the in-wheel electric motor.

The distributed motor drive controller configuration, where each motor drive controller 80 drives a group of three coil sub-sets with a three phase voltage, can be regarded as a group of logical sub motors. Each logical sub-motor can be driven independently of the other sub motors within the in-wheel electric motor under the control of the associated motor control unit, with each logical sub-motor being driven as a three phase motor.

The motor drive controller 80, which acts as an inverter for the associated logical sub-motor, includes a switching circuit that includes a number of switches that typically comprise one or more semiconductor devices.

In this embodiment, each motor drive controller 80 is substantially wedge-shaped. This shape allows multiple motor drive controllers 80 to be located adjacent each other within the motor, forming a fan-like arrangement.

The motor drive controller 80 switches can include semiconductor devices such as MOSFETs or IGBTs. In the present example, the switches comprise IGBTs. Any suitable known switching circuit can be employed for controlling the current within the coils of the coil sub-set associated with the motor drive controller 80, where one well known example of such a switching circuit is the H-bridge circuit.

As illustrated in FIG. 5, a motor control unit 150 is coupled to each of the motor drive controllers 80 within an in-wheel electric motor, with a separate motor control unit 150 being provided for each in-wheel electric motor. The motor control unit 150 is arranged to control the operation of the individual motor drive controllers 80 for each in-wheel electric motor and acts as an interface between the master controller 102 and the plurality of motor drive controllers 80. Preferably the respective motor control units for each of the in-wheel electric motors are mounted to the respective in-wheel electric motors stator. However, the motor control unit can be located in other locations within the vehicle.

Each motor control unit associated with a respective in-wheel electric motor is arranged to receive control messages from the master controller 102 via a CAN interface, however any form of communication link between the master controller 102 and the respective motor control units could be used.

In response to received control messages from the master controller 102, the motor control units are arranged to control the operation of each of the associated motor drive controllers 80, where control logic incorporated in the associated motor drive controllers 80 is arranged to operate the switches in accordance with a pulse width modulation scheme for controlling the torque of the respective logical sub motor, as is well known to a person skilled in the art.

To allow optimum operation of the motor drive controllers 80, and consequently the respective logical sub motors, the motor drive controllers 80 are arranged to provide data, for example rotor positional information, to their respective motor control unit, which in turn can be provided via the CAN interface to the master controller 102.

Similarly, the master controller 102 can send control messages to the respective motor control units to control the rotational position of the respective in-wheel motors, for example using standard motor position control.

If standard motor position control methods are used to control the rotational position of the respective in-wheel motors, the associated motor position control algorithms can be implemented either in the master controller 102, the motor control units or the motor drive controllers 8. To control the rotational position, the position demand could be derived, for example, from a position profile generator with the rotational position of the rotating element being used as an input.

Examples of position control parameters used to control the rotational position of the in-wheel motors could include max acceleration, max deceleration, max speed. A generic control loop feedback controller, for example, a Proportional Integral Derivative controller (PID) controller could be used to control the position loop. However, additional features could be incorporated into the PID controller to help reduce the possibility of overshoot and reduce jerk such as soak/ramp type of profile generator.

An autotuning algorithm could be used to calculate the PID parameters during vehicle commissioning/configuration. Preferably, position demands will be Relative Move demands rather than Absolute Move, for example the rotational position control messages would indicate a desired angle of rotation from the motors current position rather than an absolute wheel position.

Rotational position control of the in-wheel electric motors using the above system will now be described.

Upon activation of the rotational positioning drive mode the control device 110 is arranged to output a signal indicating the angular position of the rotational element 120. The position signal is provided to the master controller 102.

To move the vehicle a required distance a user rotates the control device's rotational element 120 in a forward or backward direction, for example a clockwise or anticlockwise direction, depending upon the direction the user wishes to move the vehicle, where the direction of rotation of the rotational element 120 defines whether the vehicle will move in a forward or backward direction. For example, the system can be configured so that a clockwise rotation of the rotational element 120 results in the vehicle moving in a forward direction and an anticlockwise rotation results in the vehicle moving in a backward direction.

As the rotational element 120 is being rotated the angular position of the rotational element 120 is communicated, via a control signal, to the master controller 102. The master controller 102 uses the initial rotational position of the rotational element 120 to determine the angular movement and direction that the rotational element 120 is being turned through.

The controller 102 instructs the respective motor control units to rotate the respective in-wheel electric motor an amount corresponding to the rotation of the control devices rotational element 120. The controller 102 can be arranged to send to the respective motor control units 150 an angle that the respective in-wheel electric motors need to rotate through or, using the angular position data provided by the respective motor control units 150, an actual rotational position.

Once the respective in-wheel electric motors have been rotated to the required position the movement of the respective in-wheel electric motor rotor is stopped.

The rate of rotation of the in-wheel electric motors can be synchronized to that of the control device's rotational element 120. Alternatively, the master controller 102 can be configured to control the rate of rotation of the in-wheel electric motors to a predetermined rotational rate.

Once the vehicle has been moved the required distance the positional control device mode can be deactivated, thereby preventing the control device from accidently being used to cause the in-wheel electric motors to move.

To minimize the risk of a collision occurring between the vehicle and an object, the controller 102 is preferably coupled to one or more position sensors that provide an indication as to how close the vehicle is to an object. If the controller 102 determines that the vehicle is within a predetermined distance of an object the controller inhibits movement of the vehicle, thereby preventing a user moving the vehicle via the control device.

It will be apparent to those skilled in the art that the disclosed subject matter may be modified in numerous ways and may assume embodiments other than the preferred forms specifically set out as described above, for example separate control devices 110 could be used to control the angular position control of different wheels of the vehicle or the position of the control dial 120 (i.e. the rotating element 120) could be mapped to the speed of the vehicle. For example, clockwise rotation of the control dial 120 could correspond to forward motion of the vehicle at a speed proportional to the amount of rotation. As such, when a vehicle is required to travel a greater distance the vehicle also travels at a greater velocity. Alternatively, the control dial 120 could be used solely to control the speed of the vehicle, where the position of the control dial 120 is mapped to the speed of the vehicle but the position of the control dial 120 does not limit the distance travelled by the vehicle.

The invention claimed is:

1. A control device for a vehicle, the control device comprising a rotational element and a position sensor for outputting a signal indicative of an angle that a wheel of a vehicle is to be rotated through, wherein rotation of the wheel causes movement of the vehicle a distance in a forward or backward direction, wherein the indicated angle is based on an angle that the rotational element is rotated through.

2. A control device according to claim 1, wherein the rotational element is a control dial.

3. A control device according to claim 2, wherein the signal indicative of the angle that the wheel of the vehicle should be rotated through substantially corresponds to an angle that the control dial is rotated through.

4. A control device according to claim 1, further comprising an interface for interfacing the control device to an electric motor control system within the vehicle.

5. A vehicle comprising at least one wheel for allowing movement of the vehicle and a control device comprising a rotational element and a position for outputting a signal indicative of an angle that the at least one wheel of the vehicle is to be rotated through, wherein rotation of the at least one wheel causes movement of the vehicle a distance in a forward or backward direction, wherein the indicated angle is based on an angle that the rotational element is rotated through.

6. A vehicle according to claim 5, further comprising an electric motor for driving the at least one wheel.

7. A vehicle according to claim 5, further comprising a plurality of in-wheel electric motors for driving a respective plurality of wheels.

8. A vehicle according to claim 5, further comprising a controller arranged to drive the electric motor or plurality of in-wheel electric motors to rotate the at least one wheel in response to the signal indicative of an angle that the at least one wheel of the vehicle should be rotated through.

9. A vehicle according to claim 5, further comprising a plurality of wheels for allowing movement of the vehicle and a plurality of control devices, wherein each control device is arranged to control the rotation of a respective wheel of the vehicle.

10. A vehicle according to claim 5, further comprising a position system having the position sensor, wherein the position system is arranged to inhibit movement of the vehicle based on data received from the position sensor.

* * * * *